July 20, 1965 V. J. SOVIERO, JR 3,195,223
METHOD OF WINDING
Filed March 31, 1961 3 Sheets-Sheet 1

INVENTOR.
VINCENT J. SOVIERO, JR.
BY
ATTORNEY

July 20, 1965  V. J. SOVIERO, JR  3,195,223
METHOD OF WINDING

Filed March 31, 1961  3 Sheets-Sheet 3

INVENTOR.
VINCENT J. SOVIERO, JR.
BY
ATTORNEY

United States Patent Office 3,195,223
Patented July 20, 1965

3,195,223
METHOD OF WINDING
Vincent James Soviero, Jr., Red Bank, N.J., assignor to The Bendix Corporation, Eatontown, N.J., a corporation of Delaware
Filed Mar. 31, 1961, Ser. No. 99,844
5 Claims. (Cl. 29—155.53)

The present invention relates to dynamoelectric machines and more particularly to a method of winding dynamoelectric machines.

Heretofore in winding a multiphase dynamoelectric machine it has been necessary to handle all phases simultaneously. This means that the operator must handle as many coils of wire as there are phases. This makes it easy to mix up the phases by placing the wires in the wrong slot. Further such a method of winding is slow and costly.

In the present invention, a complete phase winding is inserted in the slots without the necessity of the windings of the other phases being simultaneously handled. Further the winding is completely balanced, both electrically and mechanically with no soldered or brazed connections from one end to the other.

It is an object of the invention to provide an improved dynamoelectric machine.

Another object of the invention is to provide a novel winding process for a dynamoelectric machine.

Another object of the invention is to provide a novel method for winding a dynamoelectric machine.

Another object of the invention is to provide a completely balanced winding, both electrically and mechanically, for a dynamoelectric machine.

Another object of the invention is to provide a winding for a dynamoelectric machine which requires less time to insert and complete than other types of manually inserted windings.

The above and other objects and features of the invention will appear more fully hereinafter from a consideration of the following description taken in connection with the accompanying drawings wherein one embodiment is illustrated by way of example.

Figure 1:
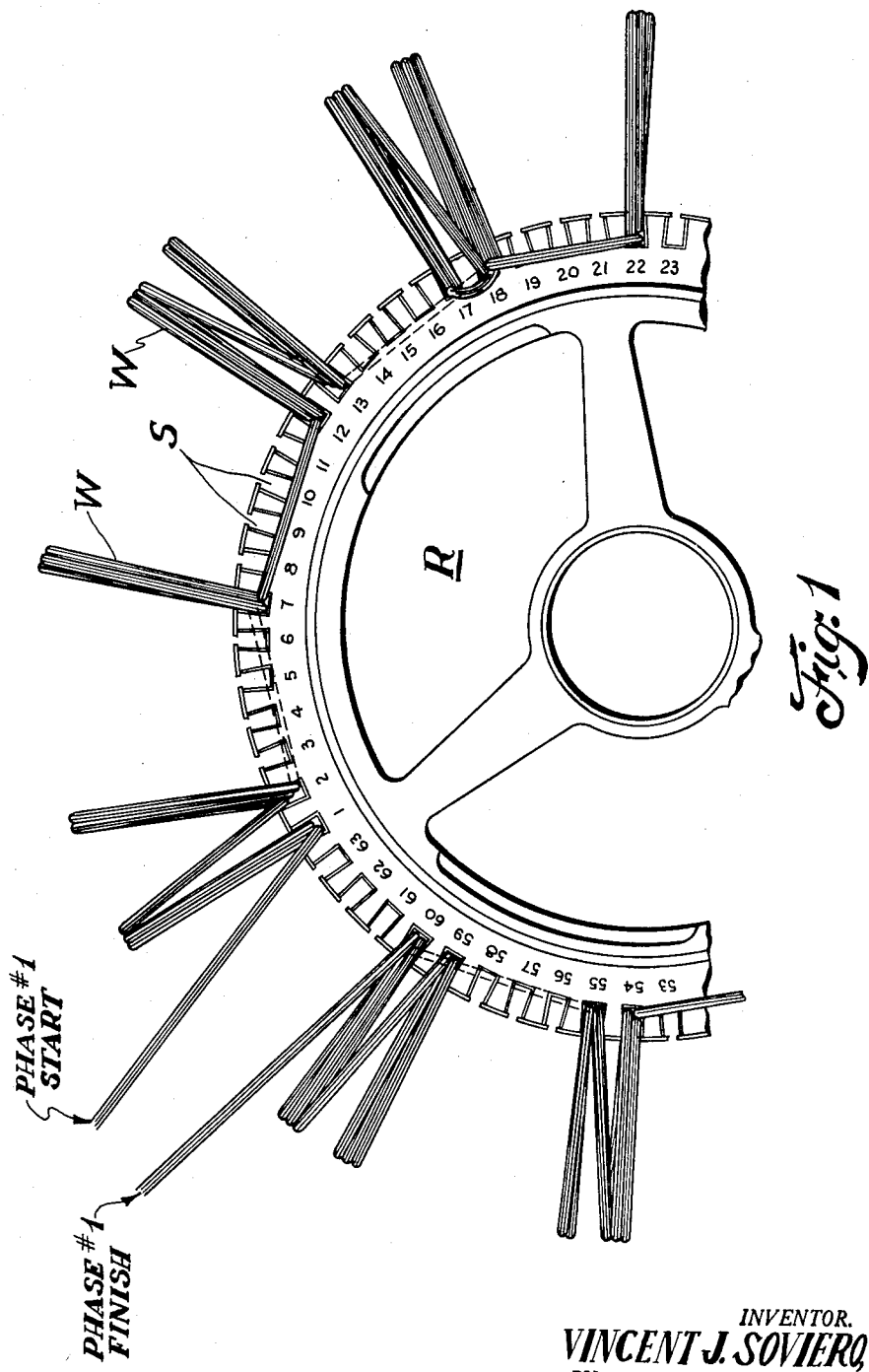
FIGURE 1 is a partial section view of a dynamoelectric machine rotor illustrating the invention.
Figure 2:
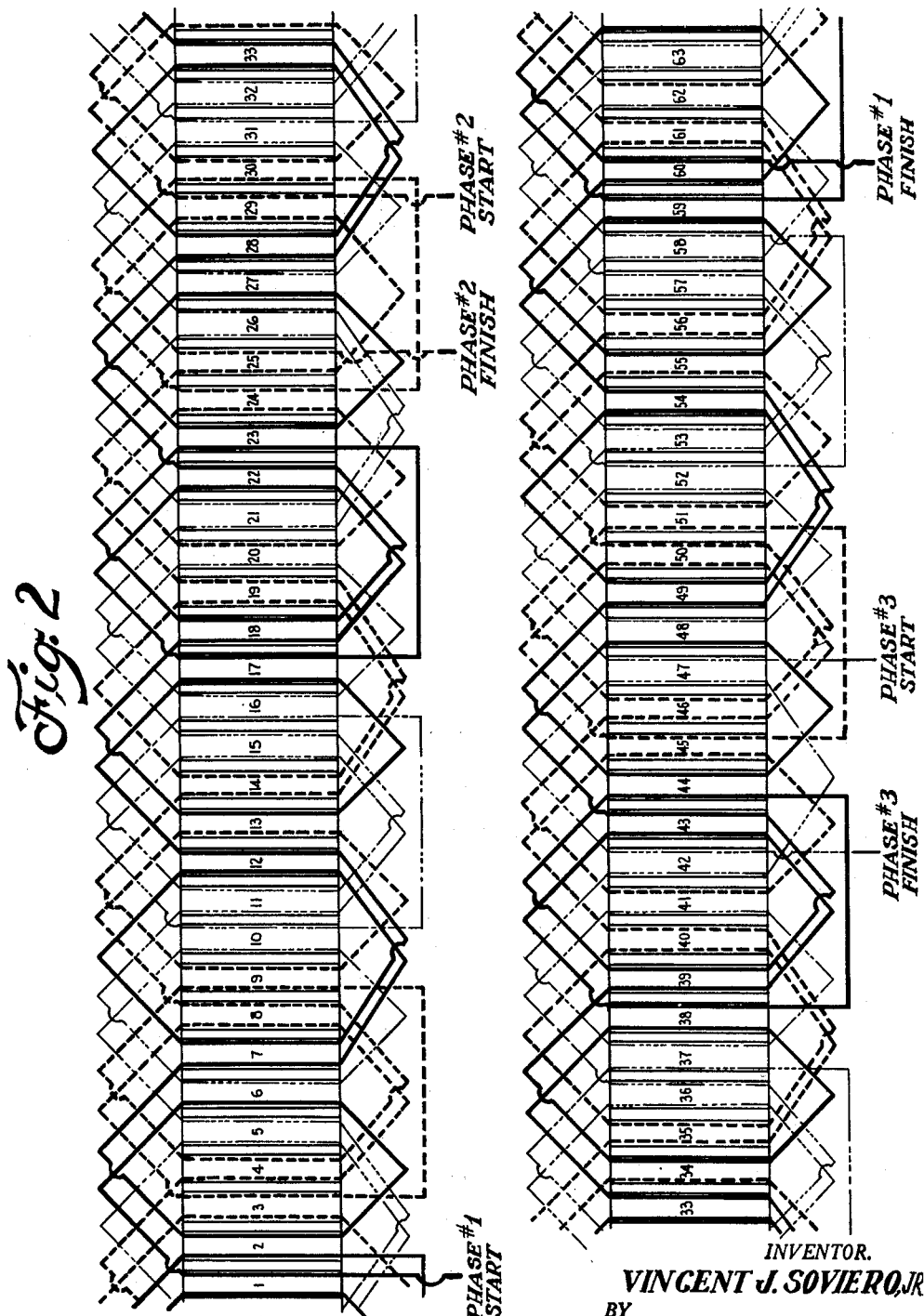
FIGURE 2 is a winding diagram of a three phase rotor winding which may be used in accordance with the invention.

Referring now to the drawings, a rotor for a dynamoelectric machine is indicated generally by the letter R. Although a rotor has been illustrated it is understood that the invention would apply equally to a stator. The rotor R has a plurality of slots S for receiving windings or coils W. In the embodiment illustrated the rotor R has 63 slots as indicated by the numerals adjacent to the slots. It is understood, however, that the number of slots may vary depending upon the number of phases and the electrical character of the machine.

The windings or coils W are wound on a form with the number of sections equal to that of the total number of coils for each phase. In the example illustrated there will be 21 sections for each of the three phases. Each coil or section is made up of a specified number of turns of a given wire size or multiples of a given wire size. The spacings of the sections of the winding form allow for the proper length of the wire connecting between the sections.

Figure 3:
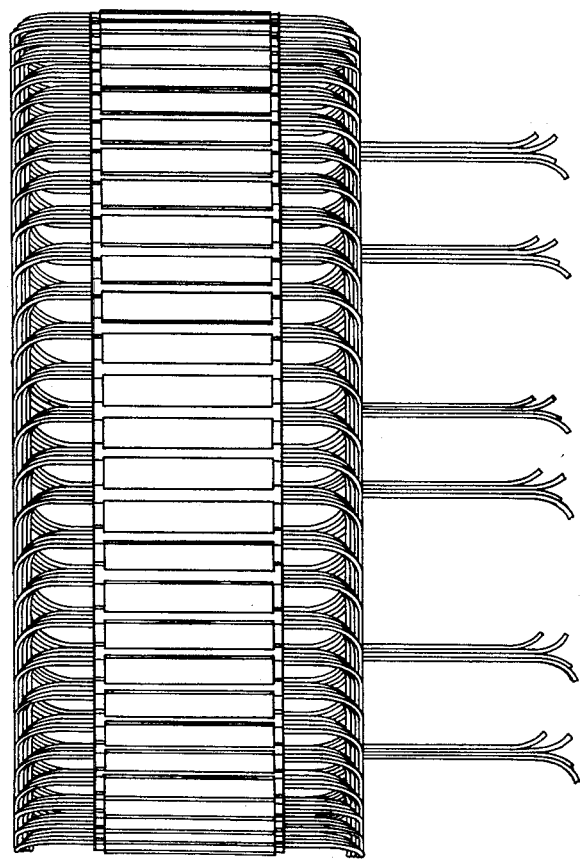
FIGURE 3 is a partial section view of a dynamoelectric machine illustrating a completed winding.

In the process of inserting the coils W in the slots S of the rotor R, the bottom part of the coils W of the first pole group are inserted in the slots S for that pole group as shown in FIGURE 1 of the drawing as inserted in slots 1 and 2. Inasmuch as the pole windings are alternately of one polarity and then of the opposite polarity, it is required that the coils be arranged in clockwise and counterclockwise groups alternately. Since all the coils are wound in the same direction on the winding form, for example, clockwise as illustrated, it is necessary to invert or turn upside down the coil groups for the opposite polarity poles as is shown in slot 7. The interconnections between the groups of coils are formed from the last turn of the previous coil group. On the clockwise wound coil groups this interconnection is laid down in its proper slot prior to the insertion of the bottom coil side of the last coil of the clockwise group of coils. This feature of placing the interconnections at the particular stage in the winding process makes it possible for the coils to be inserted as heretofore described to provide a winding that is electrically as well as mechanically balanced. In the aforenoted arrangement the wire between coils will be first on one side and then on the other, thus providing a balanced winding. All of the coils of the first phase are inserted as heretofore described before the next phase is started. The coils of the next phase are inserted in like manner before the third phase is started. Thus all of the bottom coil sides of the phases are inserted before any of the top coil sides are inserted. The top sides of all the coils are then laid down consecutively, coil after coil (see FIGURE 3). No special attention or precautions are required in this stage of the winding as the top sides fall into their respective slots.

In the aforenoted novel method of winding, the only connections will be at the start and finish of each phase with no soldered or brazed connections from one end to the other. In the three phase example illustrated, the phases were started 120° apart to give not only electrical balance but also mechanical balance. This provided a winding with no extra buildup on what is normally the connection end.

It is understood that the conventional wedges or other means may be utilized to secure the coils in the slots. Also other winding arrangements may be carried out in accordance with the invention.

Although only one embodiment of the invention has been illustrated and described, various changes in the form and relative arrangement of the parts, which will now appear to those skilled in the art, may be made without departing from the scope of the invention.

What is claimed is:

1. A method of winding a dynamoelectric machine comprising forming windings with a number of interconnected coils equal to the total number of coils for each phase, inserting one side of the coils of one phase of the first pole group in the slots for that pole group, inverting the coils for the next pole group and inserting one side of the coils in the slots for that pole group, continuing until one side of all the coils of one phase have been inserted in the proper slots, inserting the one side of the next phase in like manner, and continuing until all of one side of each phase has been inserted, then inserting the other side of the coils in the proper slots consecutively to complete the winding.

2. The method as set forth in claim 1 in which the interconnection from the coils of the first pole group is inserted prior to the insertion of the one side of the last coil of that group.

3. The method as set forth in claim 1 in which the start of the windings for the phases are spaced equally apart.

4. A method of winding a three phase dynamoelectric machine having a plurality of poles, comprising winding three phase windings each having a number of interconnected coils equal to that of the total number of coils for each phase, inserting one side of the coils of the first phase in the slots for a first pole group, inverting the coils for the next pole group and inserting one side in the slots of that pole group and continuing alternately until the one side of all of the coils of the first phase are inserted in the proper slots, inserting the one side of the coils of second phase in like manner, then inserting the one side of the coils of third phase in the same manner, and then inserting the other side of the coils of all three phases consecutively in their respective slots.

5. The method as set forth in claim 4 in which the interconnections between the pole groups are placed in the slots before the insertion of the one side of the last coil of the group of coils.

References Cited by the Examiner
UNITED STATES PATENTS

| | | | |
|---|---|---|---|
| 2,483,024 | 9/49 | Roters | 29—155.53 |
| 2,763,916 | 9/56 | Korski | 29—155.53 |
| 2,780,742 | 2/57 | Jenner et al. | 310—179 |
| 2,894,157 | 7/59 | Morrill | 310—179 |

JOHN F. CAMPBELL, *Primary Examiner.*

MILTON O. HIRSHFIELD, *Examiner.*